(12) United States Patent  
Chady (10) Patent No.: US 10,724,635 B1
(45) Date of Patent: Jul. 28, 2020

(54) PISTON ROD ASSEMBLY OF A HYDRAULIC FLUID PUMP

(71) Applicant: GARDNER DENVER PETROLEUM PUMPS, LLC, Tulsa, OK (US)

(72) Inventor: Kyle Christopher Chady, Broken Arrow, OK (US)

(73) Assignee: GARDNER DENVER PETROLEUM PUMPS, LLC, Tulsa, OK (US)

( * ) Notice: Subject to any disclaimer, the term of this patent is extended or adjusted under 35 U.S.C. 154(b) by 0 days.

(21) Appl. No.: 16/521,333

(22) Filed: Jul. 24, 2019

(51) Int. Cl.
| | |
|---|---|
| *F16J 7/00* | (2006.01) |
| *F16J 13/08* | (2006.01) |
| *F16J 13/12* | (2006.01) |
| *F04B 7/00* | (2006.01) |
| *F16J 13/16* | (2006.01) |
| *F16C 3/02* | (2006.01) |

(52) U.S. Cl.
CPC ............. *F16J 7/00* (2013.01); *F04B 7/0084* (2013.01); *F16C 3/023* (2013.01); *F16J 13/08* (2013.01); *F16J 13/12* (2013.01); *F16J 13/16* (2013.01)

(58) Field of Classification Search
CPC ...... F16J 7/00; F16J 13/08; F16J 13/12; F16J 13/16; F16C 3/00; F16C 3/02; F16C 3/023
See application file for complete search history.

(56) References Cited

U.S. PATENT DOCUMENTS

| | | | |
|---|---|---|---|
| 5,904,071 A | 5/1999 | Kennedy et al. | |
| 7,287,460 B2 * | 10/2007 | Riley | F04B 53/16 92/171.1 |
| 8,701,546 B2 * | 4/2014 | Pacht | F04B 1/0408 92/128 |
| 10,036,384 B1 * | 7/2018 | Jahnke | F16J 1/12 |
| 10,267,300 B2 * | 4/2019 | Freed | F04B 39/0022 |
| 2002/0159823 A1 | 10/2002 | Aday et al. | |
| 2015/0119154 A1 * | 4/2015 | Choi | F16F 7/108 464/180 |
| 2016/0146245 A1 * | 5/2016 | Thomas | F16D 1/12 464/97 |
| 2017/0260814 A1 * | 9/2017 | Gharib | E21B 4/003 |

OTHER PUBLICATIONS

Sur-Lock Rod Link System, https://www.premiumoilfield.com/performance-enhancement/sur-lock/sur-lock-rod-link-system.html, available at least as early as Feb. 13, 2019.
Premium Oilfield Technologies Brochure, accessible at least as early as Mar. 15, 2019.

* cited by examiner

*Primary Examiner* — Prasad V Gokhale
(74) *Attorney, Agent, or Firm* — Michael Best & Friedrich LLP (57) ABSTRACT

A piston rod assembly of a hydraulic fluid pump includes an extension rod extending axially between a first axial end and a second axial end. The extension rod is defined by a first portion, a second portion, and a third portion. The first portion extends from the first axial end to the third portion and the second portion extends from the second axial end to the third portion. The piston rod assembly further includes a sleeve extending around the third portion. The sleeve is configured to couple the first portion to the second portion.

19 Claims, 11 Drawing Sheets

PISTON ROD ASSEMBLY OF A HYDRAULIC FLUID PUMP

FIELD OF THE INVENTION

The present invention relates to a hydraulic fluid pump and, more particularly, to a piston rod assembly of a hydraulic fluid pump. Drilling pumps are used to provide high pressure fluid for drilling operations. The pumps typically include reciprocating pistons that provide the necessary high pressure fluid.

SUMMARY

In one embodiment, the invention provides a piston rod assembly of a hydraulic fluid pump. The piston rod assembly includes an extension rod extending axially between a first axial end and a second axial end. The extension rod is defined by a first portion, a second portion, and a third portion. The first portion extends from the first axial end to the third portion and the second portion extends from the second axial end to the third portion. The piston rod assembly further includes a sleeve extending around the third portion. The sleeve is configured to couple the first portion to the second portion.

In another embodiment, the invention provides a piston rod assembly for a hydraulic fluid pump. The piston rod assembly includes a first portion configured to be coupled to a drive end of the hydraulic fluid pump, a second portion configured to extend within a bore of a fluid end of the hydraulic fluid pump, and a sleeve removably coupled to the first portion via relative rotation between the sleeve and the first portion and removably coupled to the second portion via relative rotation between the sleeve and the second portion.

In yet another embodiment, the invention provides a method of disassembling a piston rod assembly of a hydraulic fluid pump. The method includes rotating a sleeve relative to an extension rod, axially translating the sleeve relative to the extension rod, removing a central portion of the extension rod from between a first end portion and a second end portion of the extension rod, and axially translating the second end portion of the extension rod from a bore of the hydraulic fluid pump.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
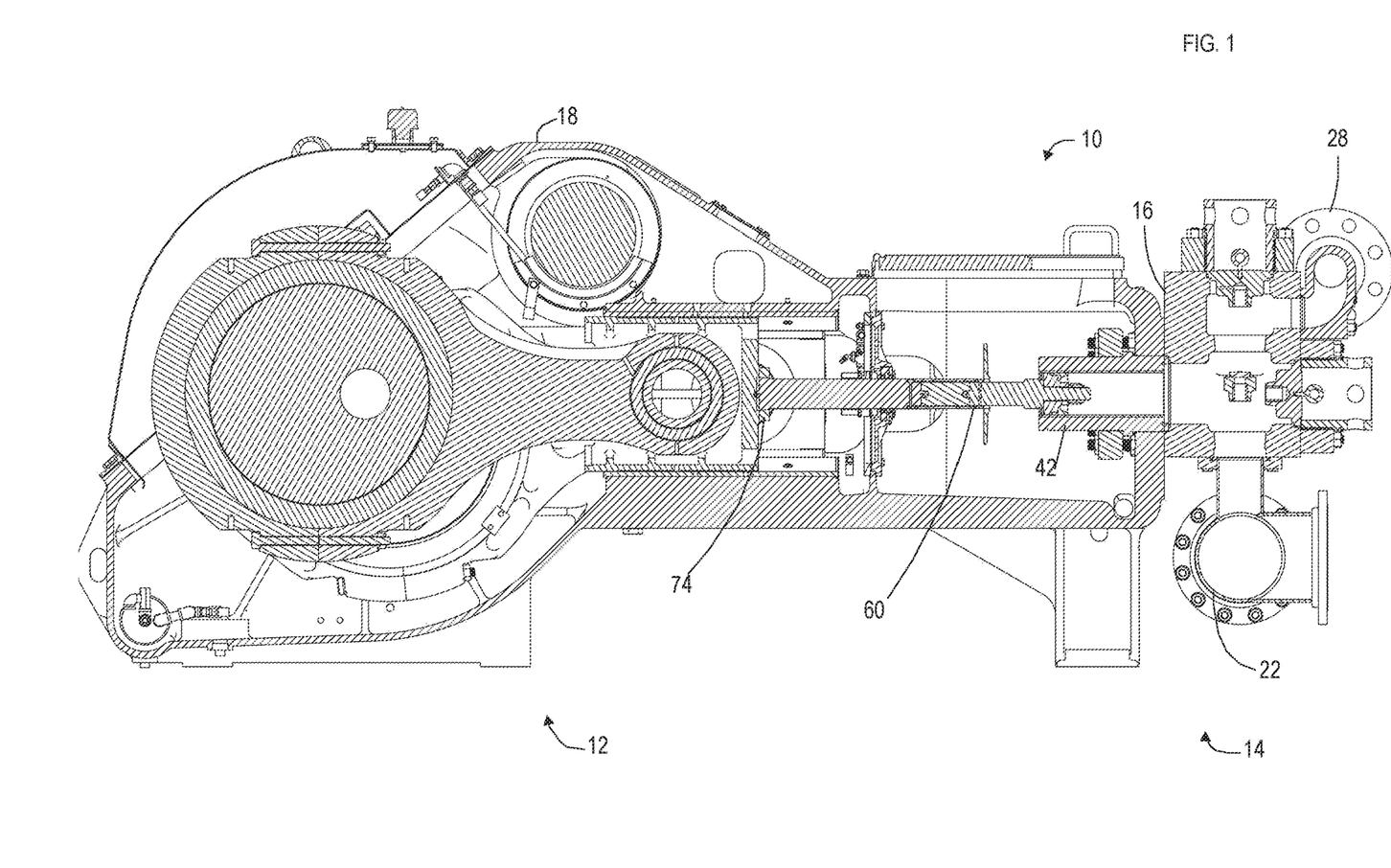
FIG. 1 is a cross-sectional view of a hydraulic fluid pump with a piston in a retracted position.
Figure 2:
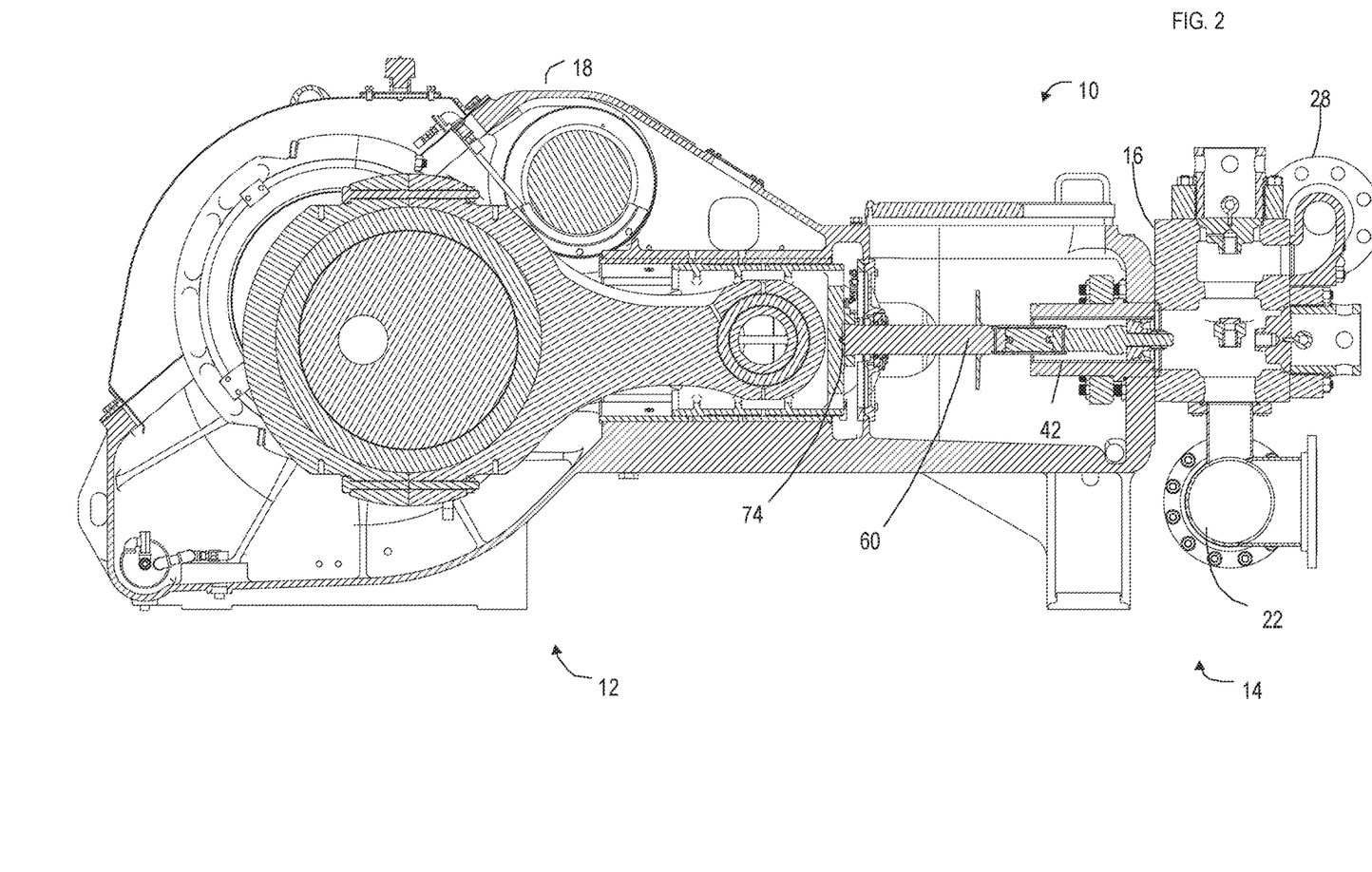
FIG. 2 is a cross-sectional view of the hydraulic fluid pump of FIG. 1 with the piston in an extended position.
Figure 3:
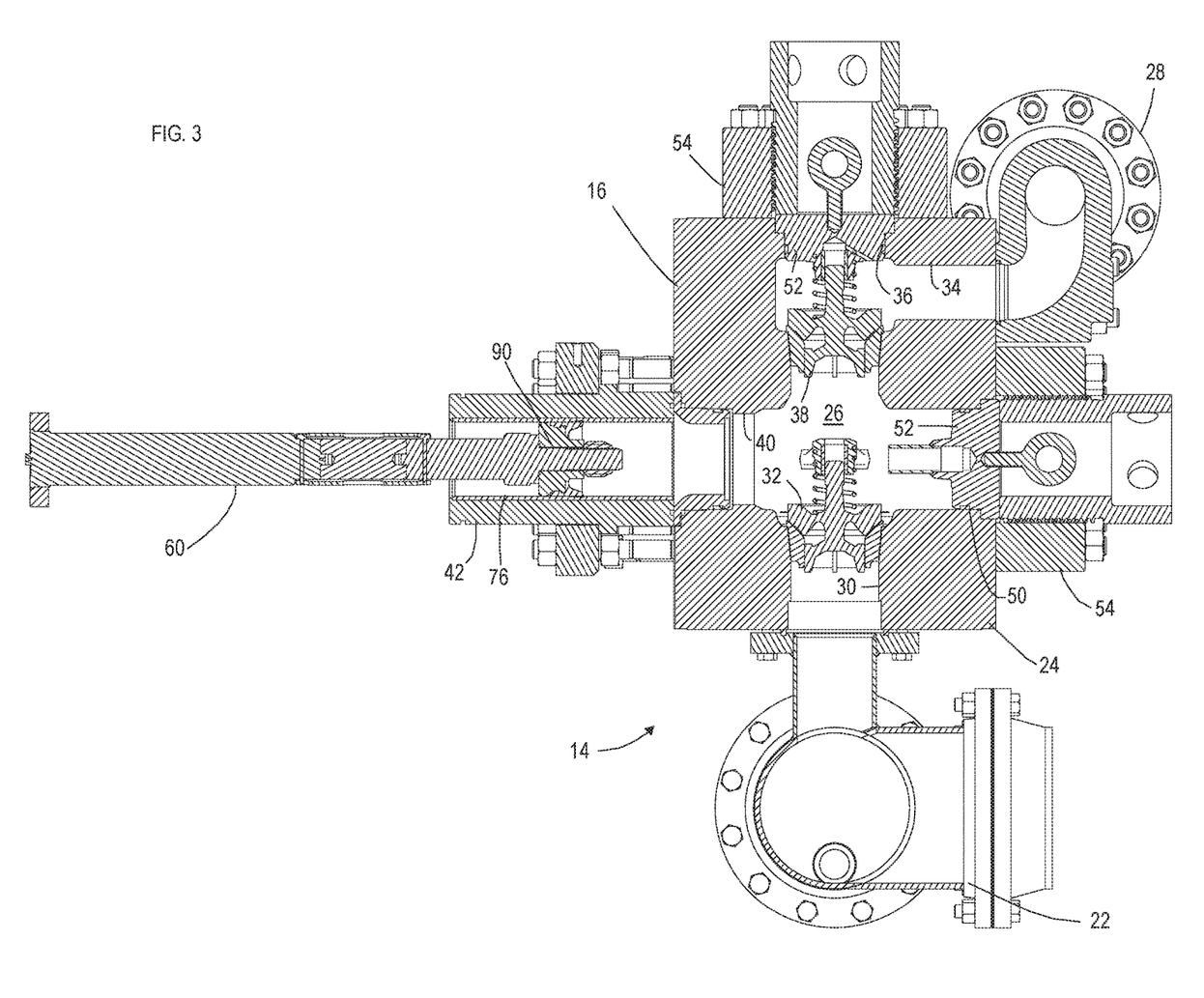
FIG. 3 is a cross-sectional view of the fluid end and piston rod assembly of the hydraulic fluid pump of FIG. 1.

FIGS. 1-3 illustrate a hydraulic fluid pump 10 (e.g., a drill pump) of the type often used during drilling and hydraulic fracturing operations such as hydrocarbon or oil fracturing. The hydraulic fluid pump 10 includes a power end or drive end or drive end assembly 12 that is largely enclosed within a casing 18. A fluid end or fluid end assembly 14 attaches to the drive end 12 and the casing 18 and includes at least one fluid end block or drilling module 16, and as shown, includes three drilling modules 16. A drive shaft (not shown) extends out of the casing 18 and provides for a connection point for a prime mover such as a motor or engine. The prime mover drives the drive shaft at a desired speed to power the drive end 12. The drive end 12 typically includes a transmission (e.g., gears, belts, chains, etc.) that serve to step down the speed of the drive shaft to a speed appropriate for the fluid end 14. The drive end 12 includes a series of reciprocating mechanisms that in turn drives a piston 66 within a respective bore of the fluid end block 16 to pump a fluid. FIG. 1 illustrates the piston 66 in a retracted position and FIG. 2 illustrates the piston 66 in an extended position.

A fluid end assembly 14 is illustrated in FIG. 3. A housing 24 defines the main body of the fluid end assembly 14 surrounding an interior volume 26. An inlet manifold 22 distributes fluid to an inlet bore 30 of each fluid end block 16. An inlet valve 32 is positioned in the inlet bore 30 to control flow from the inlet manifold 22 into the interior volume 26 of the fluid end 14, and more specifically, the interior volume 26 of the housing 24. An outlet bore 34 directs pressurized fluid from the interior volume 26, past an outlet valve 38, and to an outlet manifold 28 fastened to the fluid end 14 and aligned with the outlet 34 of the fluid end 14. The outlet manifold 28 is in fluid communication with the interior volume 26 of the housing 26 via the outlet bore 34 and outlet valve 38.

A service bore 36 is formed in the housing 24 adjacent the outlet valve 38 and in fluid communication with the outlet bore 34 at all operative times (i.e., not separated from the outlet bore 34 by the outlet valve 38). The service bore 36 is axially aligned with the inlet bore 30 and extends into the housing 24, intersecting the outlet bore 34. The service bore 36 provides access for insertion and removal of the outlet valve 38 from the housing 24 and is therefore sized to permit insertion and removal of the outlet valve 38.

A piston bore 40 extends perpendicular to the inlet bore 30 and is attached to a liner 42. A sleeve or insert 76 may be positioned within the liner 42. A reciprocating piston 66 is movable within the liner 42 (and insert 76) to pressurize fluid within the interior volume 26 and to the outlet manifold 28. The piston bore 40 may be defined by the fluid end housing 24 and may further be defined by the liner 42 fastened to the housing 24 of the fluid end 14. In some embodiments, the liner 42 may be considered part of the housing 24 of the fluid end 14. A second service bore 50 is formed in the housing 24 parallel with and axially aligned with the piston bore 40 and provides access to the interior volume 26 of the housing 24 without removal of the piston, or the valves 32, 38.

As shown, both of the service bores 36, 50 include valve covers 52 and retainer assemblies 54. The valve covers 52 seal against the housing 24 to prevent fluid from the interior volume 26 from passing through the respective bores 36, 50. Each retainer assembly 54 covers the respective valve cover 52 to retain the valve cover 52 in a sealing position within the respective bore 50, 36. When the reciprocating piston 66 increases the pressure of the fluid within the interior volume 26 of the housing 24, a force is applied on the valve covers 52. Each of the valve covers 52 is secured within the respective service bore 50, 36 via a respective valve retainer assembly 54.

Figure 4:
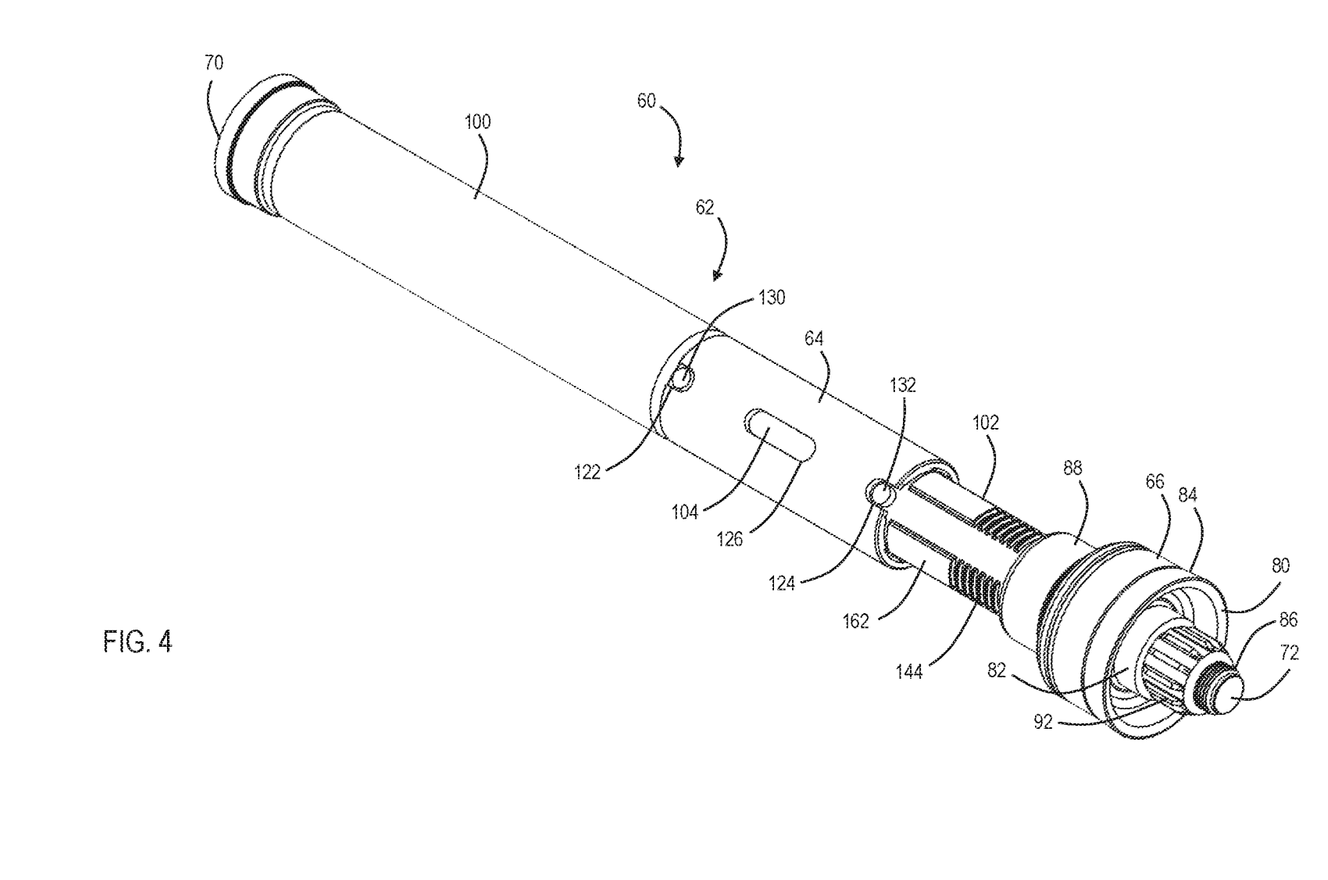
FIG. 4 is a perspective view of the piston rod assembly having an extension rod, a sleeve, and a piston.

A piston rod assembly 60 couples the drive end 12 of the hydraulic fluid pump 10 to the fluid end 14 of the hydraulic fluid pump 10. The piston rod assembly 60 includes an extension rod 62, a sleeve 64, and the piston 66. The drive end 12 generates rotational motion that is transformed into axial reciprocating motion of the piston rod assembly 60 so that the piston 66 moves within the piston bore 40 between a retracted position and an extended position. The piston 66 moves further into the housing 24 of the fluid end 14 toward the interior volume 26, and the inlet and outlet valves 32, 38 as it moves from the retracted position toward the extended position. Therefore, as the piston rod assembly 60 translates from the retracted position toward the extended position, the pressure of the fluid within the interior volume 26 of the fluid end 14 is increased.

The extension rod 62 of the piston rod assembly 60 is a generally cylindrical structure that extends axially between a first axial end 70 and a second axial end 72. The first axial end 70 of the extension rod 62 is coupled (e.g., fastened, bolted) to the crosshead 74 of the drive end 12. By this mechanical coupling, the rotation generated by the drive end 12 is transferred into linear, reciprocating motion of the extension rod 62 along the axis of the extension rod 62. The second axial end 72 of the extension rod 62 is positioned within the piston bore 40 of the fluid end 14.

A piston 66 is fastened to the second axial end 72 of the extension rod 62. The piston 66 includes a generally cylindrical outer surface that engages the piston bore 40 or a liner 76 positioned within the piston bore 40 to prevent leakage of the fluid within the fluid end 14 past the piston 66. A front surface 80 of the piston 66 engages the fluid and pressurizes the fluid as the piston 66 translates from the retracted position toward the extended position. As shown, the piston 66 is a two-part piston having a steel core 82 and a urethane outer and front facing layer 84.

Figure 7:
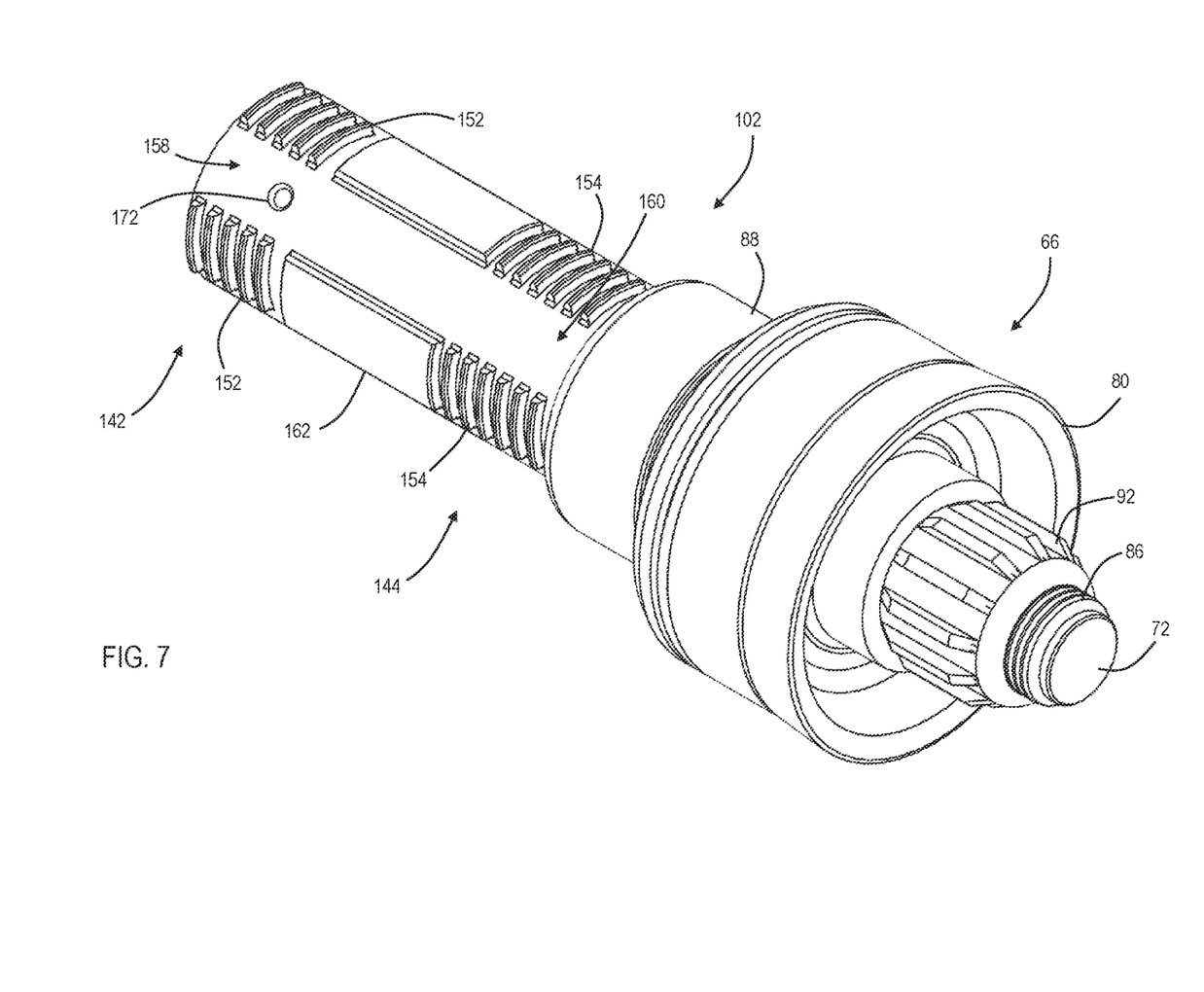
FIG. 7 is a perspective view of the second portion of the extension rod with the piston.
Figure 8:
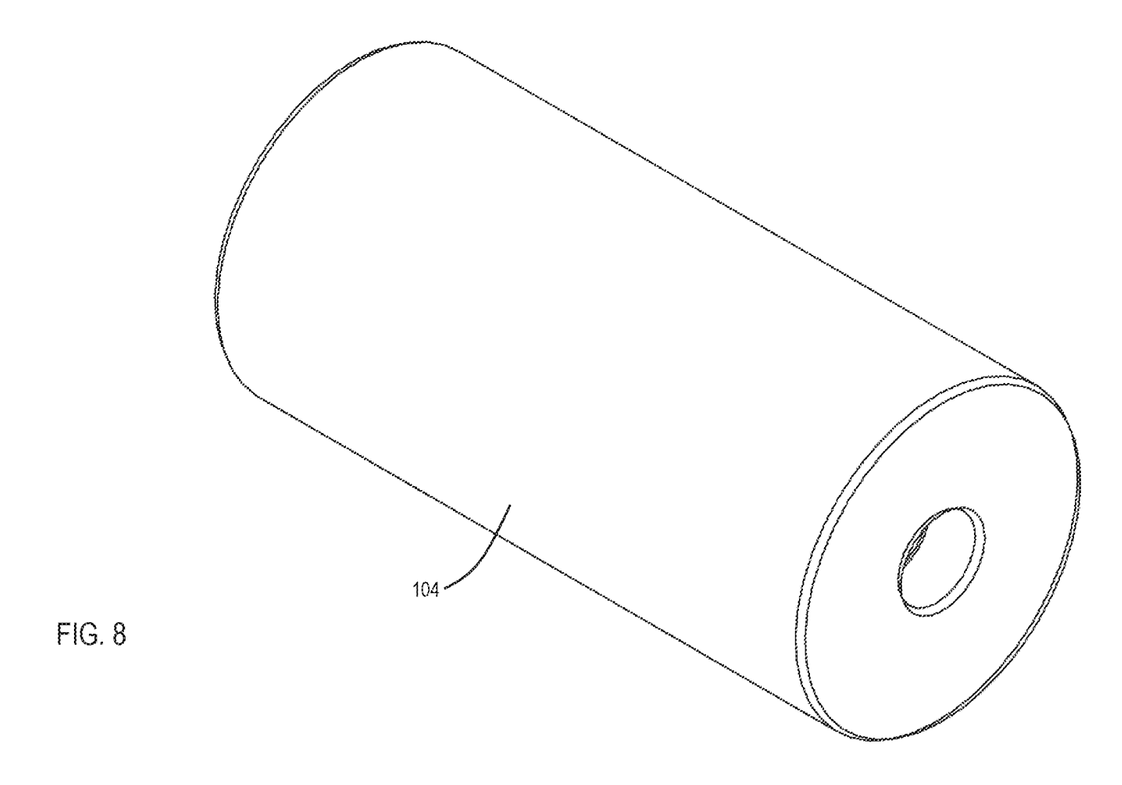
FIG. 8 is a perspective view of a third portion of the extension rod.

The second axial end 72 of the extension rod 62 is threaded, having external threads 86 along a portion of the axial length of the extension rod 62. The external threads 86 extend from the second axial end 72 of the extension rod 62 to an axial stop 88, a portion of the extension rod 62 having a larger cross-section and configured to function as a backstop for the piston 66. The piston 66 includes a central bore 90 (FIG. 3) that, in some embodiments may be threaded. In other embodiments, the central bore 90 of the piston 66 may be larger than the outer diameter of the threads 86 and the piston 66 may be unthreaded. To couple the piston 66 to the extension rod 62, the central bore 90 of the piston 66 is placed over the threads 86 of the extension rod 62 (e.g., by threading the piston 66 onto the threads 86 of the extension rod 62) until the piston 66 abuts the axial stop 88. Then, a nut 92 is threaded over the second axial end 72 of the extension rod 62 and into engagement with the piston 66, thereby sandwiching the piston 66 between the axial stop 88 and the nut 92.

The extension rod 62 includes three distinct and separable portions, a first portion 100, a second portion 102, and a third portion 104. The first portion 100 is a first end portion and extends from the first axial end 70 of the extension rod 62 (at the drive end 12 of the hydraulic fluid pump 10) to the third portion 104. The second portion 102 is a second end portion and extends from the second axial end 72 of the extension rod 62 (at the fluid end 14 of the hydraulic fluid pump 10) to the third portion 104. The third portion 104 is a central portion and is positioned between the first and second portions 100, 102. The three portions 100, 102, 104 are all axially aligned with one another and are positioned adjacent one another in a row. The first portion 100 is not directly coupled (without intervening components) to either the second portion 102 or the third portion 104. The second portion 102 is not directly coupled (without intervening components) to either the first portion 100 or the third portion 104. Likewise, the third portion 104 is not directly coupled (without intervening components) to either the first portion 100 or the second portion 102.

The sleeve 64 is a hollow cylinder and is positioned around the third portion 104. Further, the sleeve 64 partially surrounds the first and second portions 100, 102 (at the axial ends of the first and second portions 100, 102 that are opposite the first and second axial ends 70, 72 of the extension rod 62). The sleeve 64 couples the first portion 100 of the extension rod 62 to the second portion 102 of the extension rod 62. More specifically, the sleeve 64 includes a first engagement feature 110 that engages the first portion 100 of the extension rod 62 and a second engagement feature 112 that engages the second portion 102 of the extension rod 62.

Figures 9A, 9B:
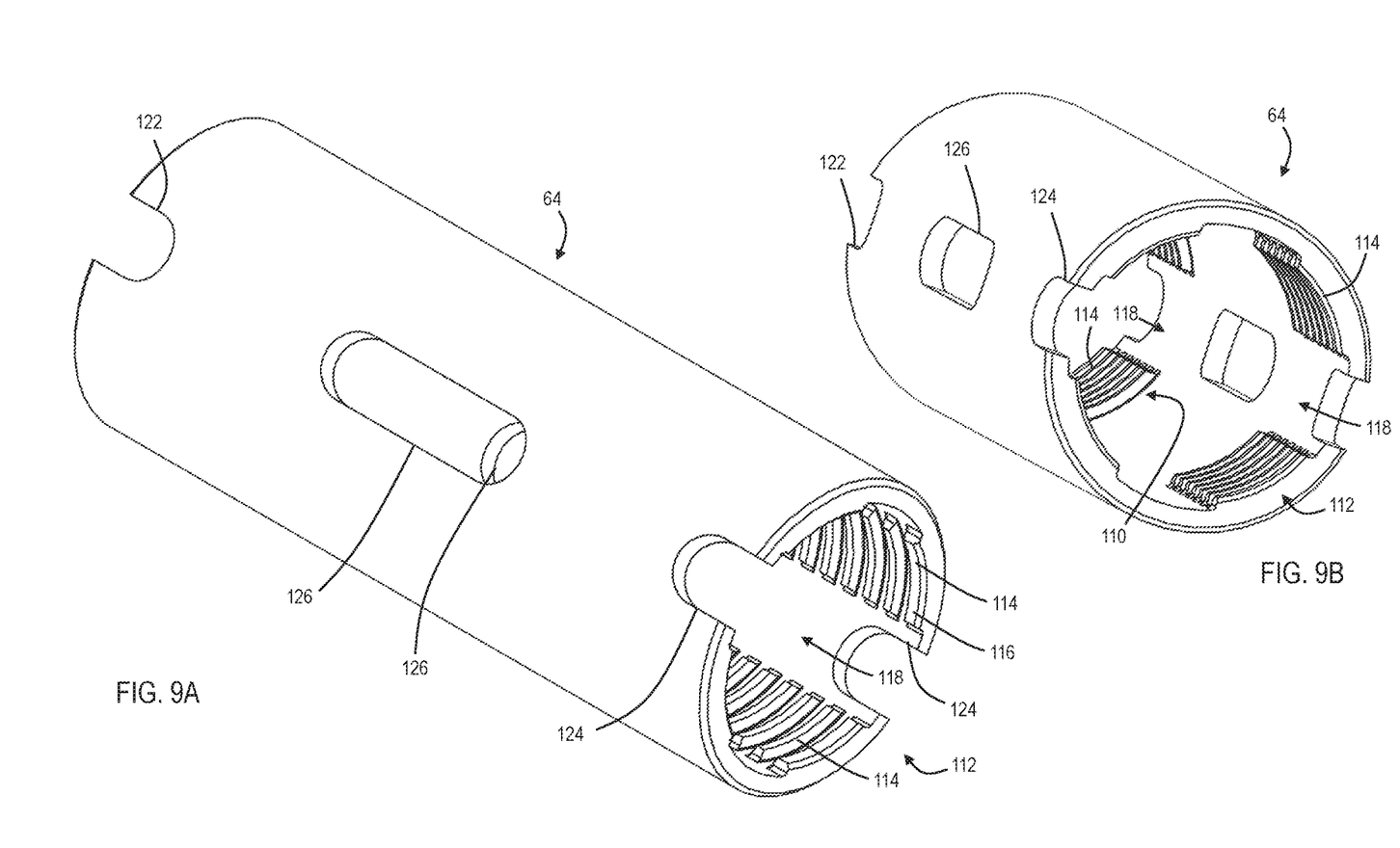
FIG. 9A is a first perspective view of the sleeve of the piston rod assembly.
FIG. 9B is a second perspective view of the sleeve of the piston rod assembly.

The engagement features 110, 112 of the sleeve 64 shown in FIGS. 9A-9B include broken, zero-pitch threads 114. The broken zero-pitch threads 114 include a plurality of axially spaced apart lugs 116 that project radially from the hollow cylinder. The lugs 116 have no pitch, such that they are non-helical, and are instead independent from one another and are circular. The lugs 116 are broken such that spaced apart gaps 118 are defined within a single thread 114. For example, as shown, a single broken zero pitch thread 114 may include four lugs 116 of approximately 45 degrees, each lug 116 separated from the adjacent lugs 116 by approximately 45 degree gaps 118.

The sleeve 64 further includes cutouts 122, 124, 126 at the axial ends of the sleeve 64. Each axial end includes two cutouts 122, 124, located radially opposite one another. The sleeve 64 also includes central cutouts 126 located radially opposite one another that form a bore through the sleeve 64. The cutouts 122, 124, 126 provide a space for pins 130, 132 to extend radially therethrough, as discussed in greater detail below.

Figure 5:
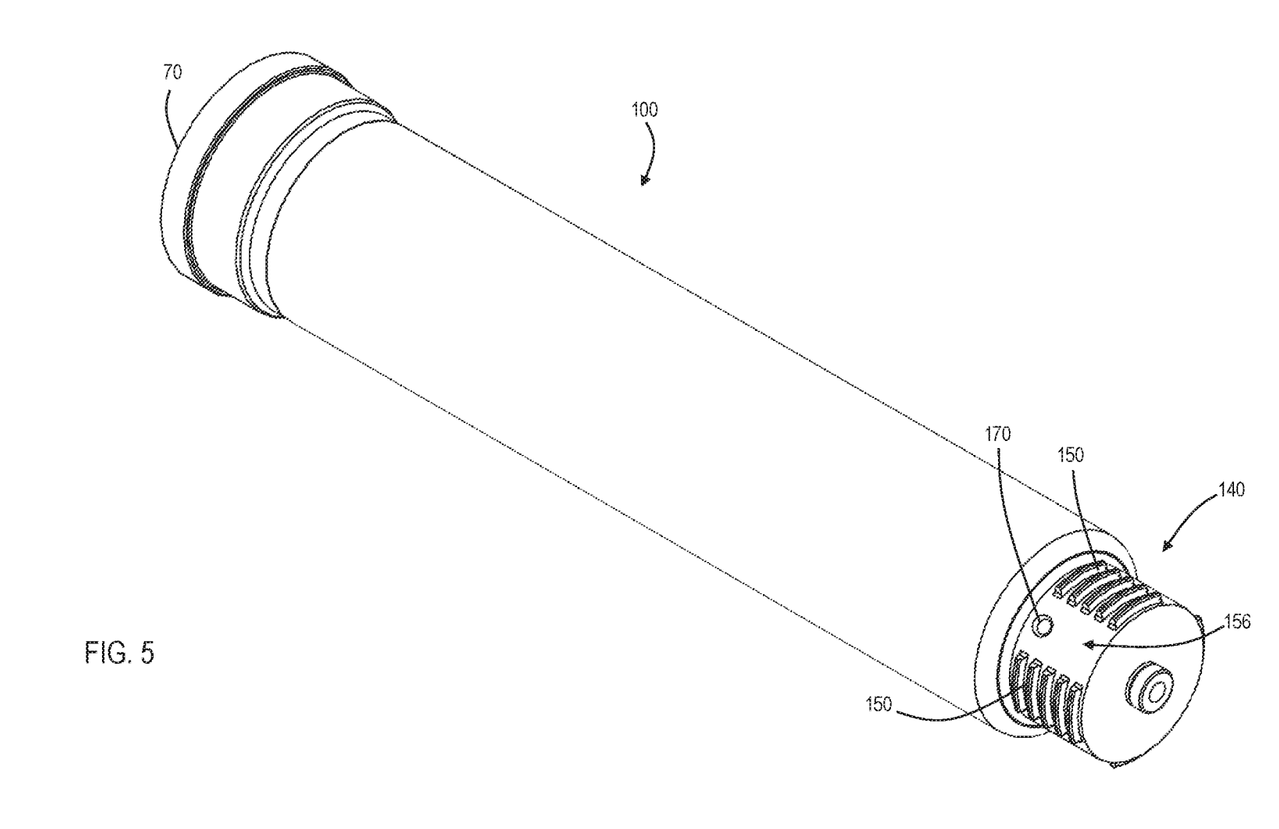
FIG. 5 is a perspective view of a first portion of the extension rod.

The first and second portions 100, 102 of the extension rod 62 include mating engagement features 140, 142, 144 that are configured to engage with the engagement features 110, 112 of the sleeve 64. More specifically, as shown in FIG. 5, the first portion 100 of the extension rod 62 includes an engagement feature 140 including broken, zero-pitch threads 150 on the axial end adjacent the third portion 104 of the extension rod 62. The axial end that supports the threads 150 on the first portion 100 has a decreased diameter relative to the remainder of the first portion 100 and is sized to fit within the sleeve 64. The threads 150 are sized, spaced, and shaped similar to the threads of the engaging threads 114 on the sleeve 64, though, they may be otherwise sized, spaced, and shaped based on the configuration of the threads 114 on the sleeve 64 to properly permit threading and engagement of the threads 114. The engagement feature 140 of the first portion 100 engages with the first engagement feature 110 of the sleeve 64.

Figure 6:
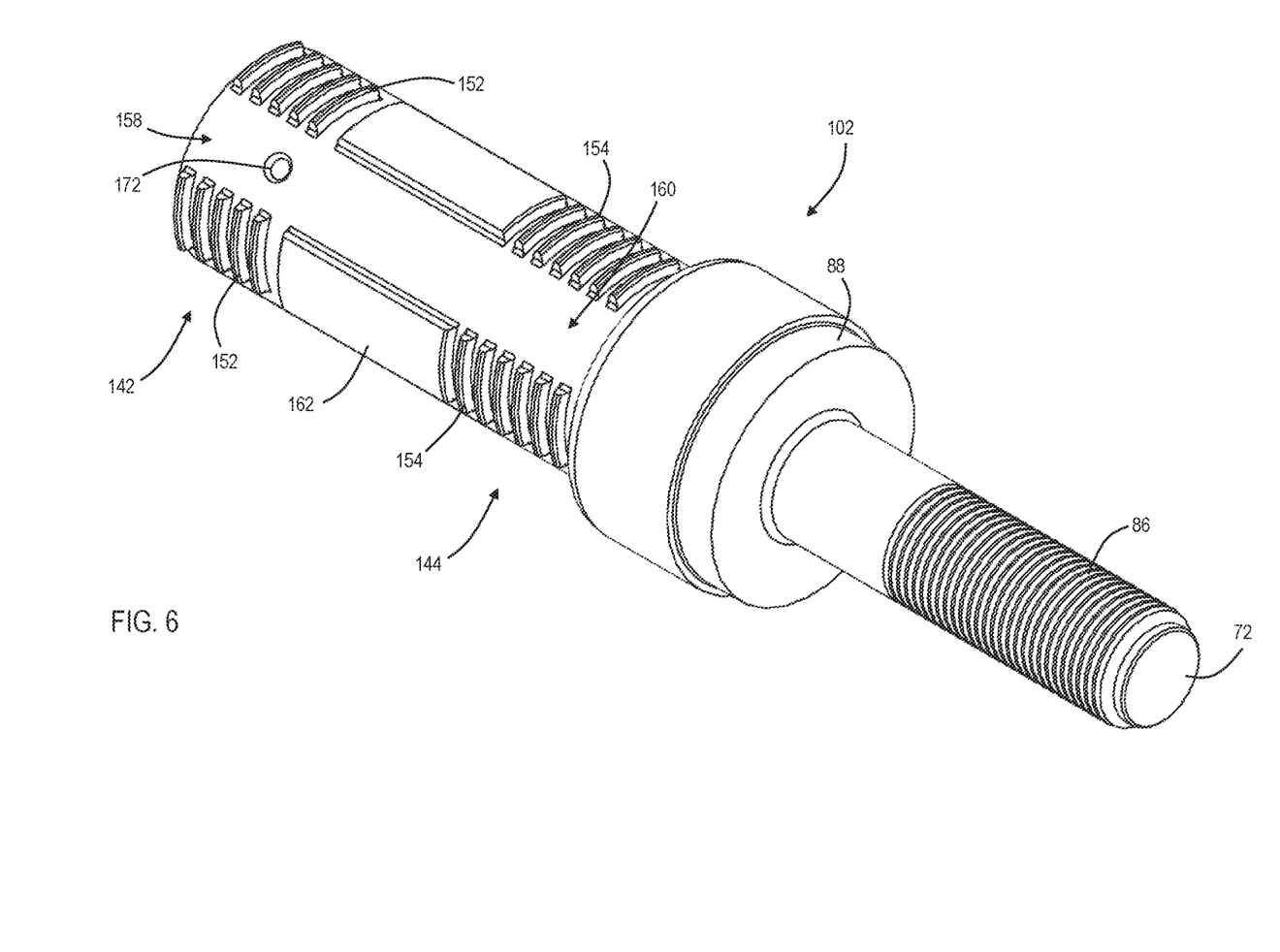
FIG. 6 is a perspective view of a second portion of the extension rod.

Similarly, as shown in FIG. 6, the second portion 102 of the extension rod 62 includes an engagement feature 142 including broken, zero-pitch threads 152 on the axial end adjacent the third portion 104 of the extension rod 62. The axial end is sized to fit within the sleeve 64. The threads 152 on the second portion 102 are sized, spaced, and shaped similar to the threads of the engaging threads 114 on the sleeve 64 and engage with the threads 114 of the second engagement feature 112 of the sleeve 64.

The second portion 102 further includes a second engagement feature 144, axially spaced from the first engagement feature 142. The second engagement feature 144 includes additional broken, zero-pitch threads 154 that are axially spaced apart from the first engagement feature 142 of the second portion 102 and are otherwise similar in size, shape, spacing, and rotational alignment with the first engagement feature 142 of the second portion 102 such that the threads 152, 154 are aligned and the gaps 158, 160 between the threads 152, 154 are aligned. A blocking member 162 is located in the axial space between the first and second engagement features 142, 144 to define a boundary between the two engagement features 142, 144 and prevent the sleeve 64 from simultaneously engaging both of the first and second engagement features 142, 144.

The sleeve 64 is configured to rotate between an engaged position and a disengaged position. In the engaged position, the sleeve 64 is coupled to both of the first and second portions 100, 102 of the extension rod 62. The engagement features 110, 112 are engaged with one another as discussed above such that axial motion of the first portion 100 results in similar axial motion of the second portion 102. To transform from the engaged position to the disengaged position, the sleeve 64 is rotated to uncouple the engagement features 110, 112 from those of the first and second portions 100, 102. As shown, with the zero-pitch threads 114 broken into four separate sets of lugs 116, each separated by an equally sized gap 118, when the sleeve 64 is rotated from the engaged position by 45 degrees (one eighth of a full rotation), the threads 114 of the sleeve 64 are misaligned with the threads 150, 152, 154 of the first and second portions 100, 102 (and aligned with the respective gaps 156, 158, 160 between the threads 150, 152, 154 of the first and second portions 100, 102), the sleeve 64 is rotated to the disengaged position. Similarly, the sleeve 64, in the disengaged position, is rotated by 45 degrees to the engaged position. In some embodiments, the sleeve 64 may be rotated in either direction between the disengaged and engaged positions. In other embodiments, the sleeve 64 may be limited to only one direction of rotation between the engaged and disengaged positions.

First and second pins 130, 132 prevent rotation of the sleeve 64 from the engaged position to the disengaged position without first removing the pins 130, 132. As discussed above, the sleeve 64 includes cutouts 122, 124, 126 through which the pins 130, 132 extend. The pins 130, 132 also extend radially through the first and second portions 100, 102 of the extension rod 62. Specifically, each of the first and second portions 100, 102 includes a radial bore 170, 172 extending through the diameter of the respective portion 100, 102 such that the pin 130, 132 extends through the first cutout 122, 124, 126 in the sleeve 64, through the radial bore 130, 132, and through the second cutout 122, 124, 126 in the sleeve 64. As shown, the pins 130, 132 are unthreaded such that they can be manually removed without tools. The pins 130, 132 do not couple any of the portions 100, 102, 104 of the extension rod 62 or the sleeve 64 to one another. The pins 130, 132 prevent rotation of the sleeve 64 relative to the extension rod 62 without first removing the pins 130, 132.

Figure 10A:
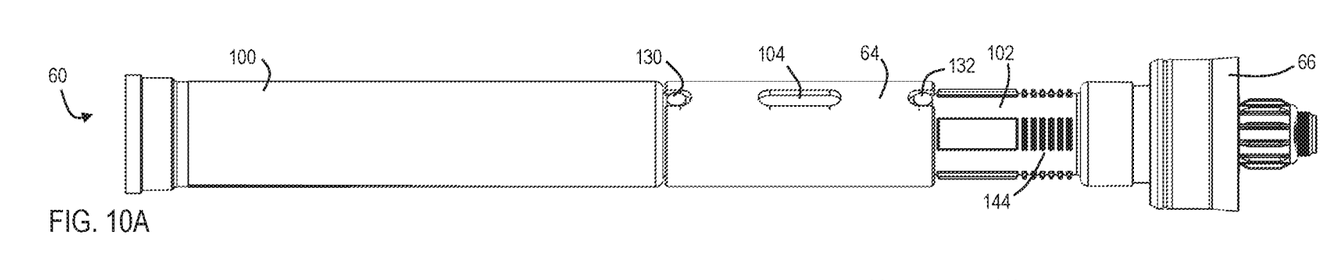
FIG. 10A is a side view of the piston rod assembly for normal operation.
Figure 10B:
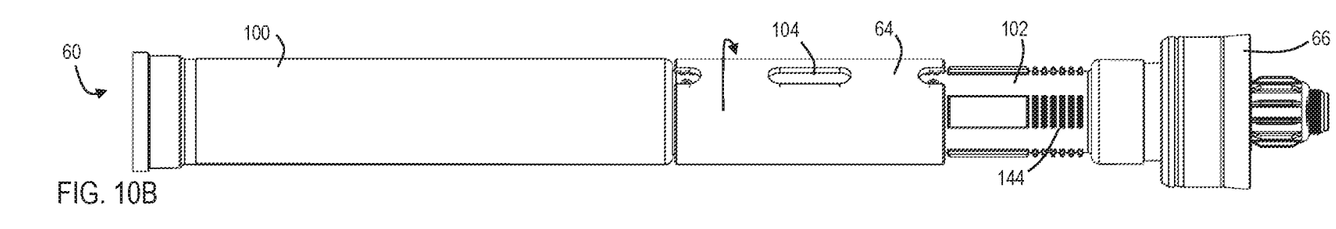
FIG. 10B is a side view of the piston rod assembly in a first step of disassembly
Figure 10C:
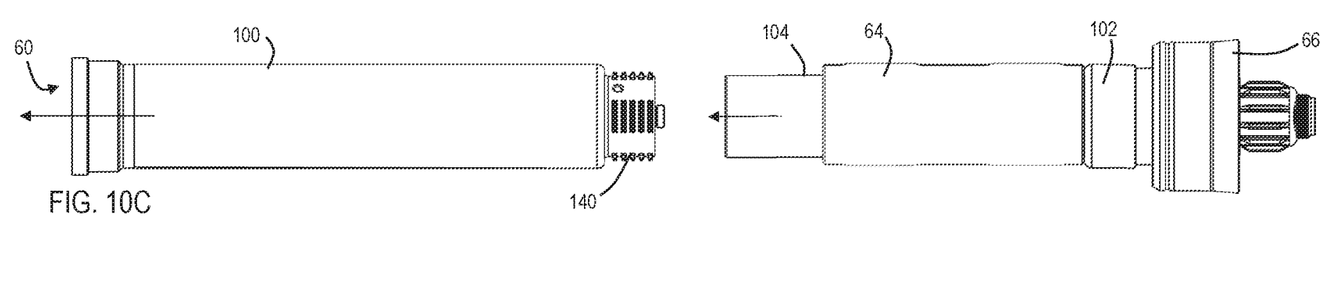
FIG. 10C is a side view of the piston rod assembly in a second step of disassembly.

The sleeve 64 is configured to translate axially between a first axial position (FIG. 10B) and a second axial position (FIG. 10C). In the first axial position, the sleeve 64 surrounds the third portion 104 of the extension rod 62 and is couplable to the first and second portions 100, 102 via the engagement feature 140 of the first portion 100 and the first engagement feature 142 of the second portion 102. In the second axial position, the sleeve 64 partially surrounds the third portion 104, but uncovers at least a portion of the third portion 104. In the second axial position, the sleeve 64 is couplable to the second portion 102 via the second engagement feature 144 of the second portion 102. As described in greater detail below with respect to FIG. 10D, in the second axial position, the sleeve 64 can still be coupled to the first portion 100 via the engagement feature 140 of the first portion 100.

The third portion 104 is removable when the sleeve 64 is translated to the second axial position. When the sleeve 64 is decoupled from the first portion 100 and in the second axial position, the first portion 100 of the extension rod 62 can be driven by the drive end 12 to move the first portion 100 away from the second and third portions 102, 104, defining a large enough gap to remove the third portion 104 from the sleeve 64 and the second portion 102. In some embodiments, moving the sleeve 64 to the second position may clear enough space to remove the third portion 104 without first driving the first portion 100 away from the second and third portions 102, 104. With the third portion 104 removed from the second portion 102, an axial gap exists between the first and second portions 100, 102 that permits removal of the second portion 102 and the piston 66 attached thereto from within the fluid end 14. Therefore, the piston 66 and/or the liner 76 can be removed from the fluid end 14 and/or the fluid end 14 can be removed from the drive end 12, all without disassembling the first portion 100 of the extension rod 62 from the drive end 12 of the pump. Further, as described in greater detail below, the first portion 100 can be moved into reengagement with the second portion 102 to enable a powered removal of the piston 66 from the fluid end 14.

In normal operation of the hydraulic fluid pump 10, the drive end 12 generates a rotational force that is transferred into a linear motion of the piston rod assembly 60 that drives the piston 66 in a reciprocating motion within the piston bore 40 of the fluid end 14. Due to normal wear, components such as the piston 66 and/or the liner 76 of the piston bore 40 may need to be replaced. However, to access these components, the piston rod assembly 60 must first be removed from the fluid end 14. As the piston rod assembly 60 is fastened to the drive end 12 and does not normally translate fully out of the fluid end 14, the piston rod assembly 60 is disassembled to remove the piston 66 from the piston bore 40.

FIGS. 10A-10F illustrate the process of removing the piston 66 from the fluid end 14. The sleeve 64 is in the engaged position and the first axial position, as shown in FIG. 10A for normal pumping operation. As shown in FIG. 10B, the pins 130, 132 are removed from the radial bores 170, 172 of the first and second portions 100, 102 of the extension rod 62 and the sleeve 64 is rotated from the engaged position to the disengaged position. When in the disengaged position, the engagement features 110, 112 of the sleeve 64 are disengaged from the engagement features 140, 142 of the first and second portions 100, 102 such that none of the first, second, or third portions 100, 102, 104 or the sleeve 64 are engaged or fastened to one another, directly, or indirectly. As shown in FIG. 10C, when the sleeve 64 is in the disengaged position, it is axially slid from the first axial position to the second axial position along the second portion 102 of the extension rod 62. In the second axial position, part of the third portion 104 (i.e., the part adjacent the first portion 100) is uncovered such that it is visible from a perspective perpendicular to the axial direction of the extension rod 62. The first portion 100 of the extension rod 62 is moved (e.g., driven by energizing the drive end 12) away from the second and third portions 102, 104, thereby providing an axial gap between the first and third portions 104 that is greater than or equal to the axial length of the third portion 104. The third portion 104 is removed from between the first and second portions 100, 102. In some embodiments, transitioning the sleeve 64 to the second axial position entirely uncovers the third portion 104 or creates a gap large enough to remove the third portion 104 without first retracting the first portion 100.

Figure 10D:
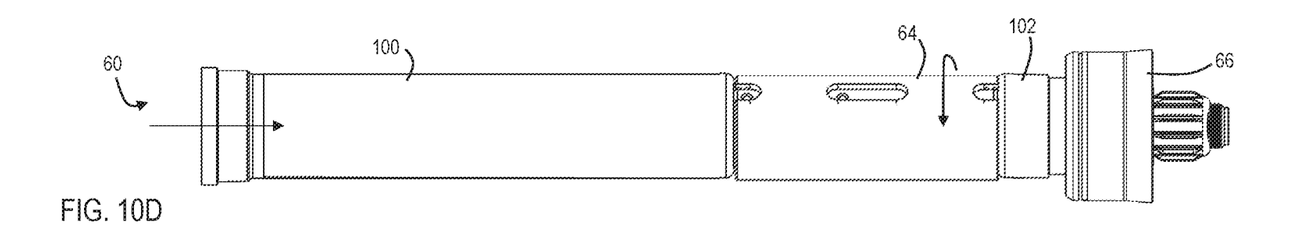
FIG. 10D is a side view of the piston rod assembly in a third step of disassembly.
Figure 10E:
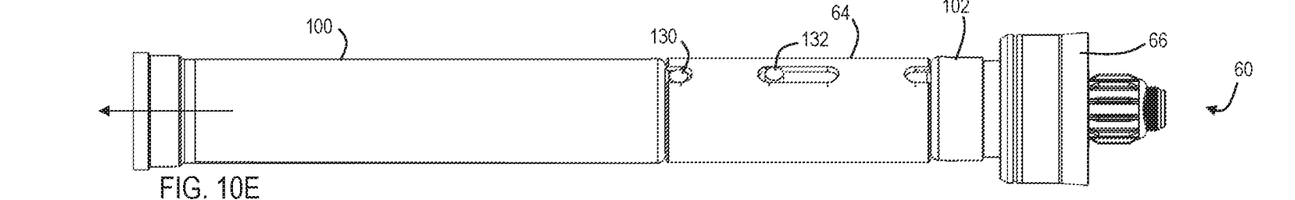
FIG. 10E is a side view of the piston rod assembly in a fourth step of disassembly.

As shown in FIG. 10D, when the third portion 104 is removed and the sleeve 64 is in the second axial position, the first portion 100 and the second portion 102 are spaced apart from one another. The first portion 100 of the extension rod 62 is moved (e.g., driven by energizing the drive end 12) from the retracted position toward the sleeve 64 and the second portion 102 until the first portion 100 is within the sleeve 64 (while the sleeve 64 is still in the second axial position) and adjacent the second portion 102. Then, the sleeve 64 is rotated from the disengaged position to the engaged position. In the engaged position, the first engagement feature 110 of the sleeve 64 reengages with the engagement feature 140 of the first portion 100 and the second engagement feature 112 of the sleeve 64 engages with the second engagement feature 144 of the second portion 102. The pins 130, 132 are then reinserted into the radial bores 170, 172 in the first and second portions 100, 102 to prevent rotation of the sleeve 64 from the engaged position to the disengaged position. As shown in FIG. 10E, the pin 130 inserted into the first portion 100 is inserted through the same cutout 122 in the sleeve 64 as in FIG. 10A. The pin 132 inserted into the second portion 102 is inserted through the central cutout 126 in the sleeve 64, as the sleeve 64 is axially displaced relative to the second portion 102 in FIG. 10A. The overall length of the extension rod 62 and the piston rod assembly 60 in FIG. 10D is shorter than in FIG. 10A with the removal of the third portion 104 of the extension rod 62.

Figure 10F:
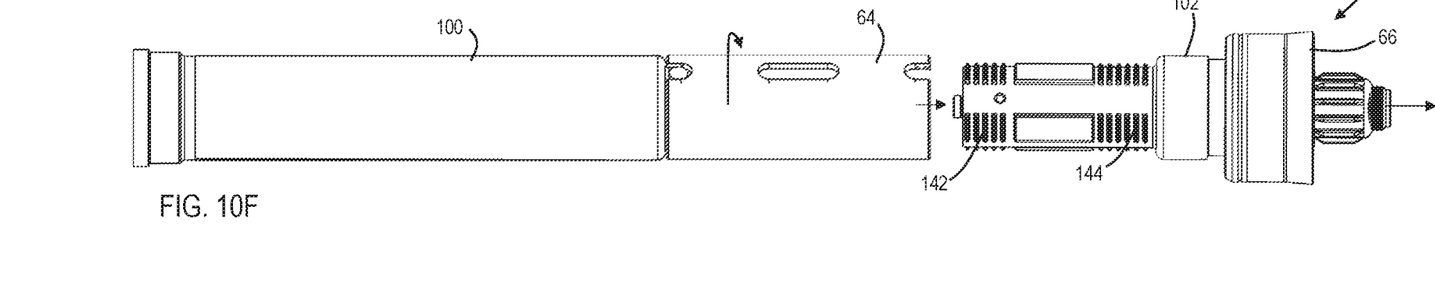
FIG. 10F is a side view of the piston rod assembly in a fifth step of disassembly.

With continued reference to FIG. 10E, when the first portion 100 is reengaged with the second portion 102 via the sleeve 64, the first portion 100 of the extension rod 62 is moved (e.g., driven by energizing the drive end 12) to retract the first portion 100, and via the sleeve 64, the second portion 102 relative to the fluid end 14 and the piston bore 40 of the fluid end 14. Because of the removal of the third portion 104 of the extension rod 62 and the subsequent shortening of the overall length of the extension rod 62, the axial retraction of the extension rod 62 moves the piston 66 out of the piston bore 40. With the piston 66 removed from the piston bore 40, the piston bore 40 is accessible. Further, as shown in FIG. 10F, the sleeve 64, second portion 102, and the piston 66 are removable from the first portion 100 for service or replacement without removing the first portion 100 from the drive end 12 of the pump.

The process of removing the piston 66 from the piston bore 40 is tool-less. The pins 130, 132 are unthreaded allowing for removal without a tool. Rotation of the sleeve 64 between the engaged position and the disengaged position and axial translation of sleeve 64 between the first axial position and the second axial position is performed by manually engaging the sleeve 64. Removal of the third portion 104 from between the first and second portions 100, 102 is performed by manually removing the third portion 104. The first portion 100 is driven relative to the second portion 102 via energizing the drive end 12 (or in other embodiments by manually translating the first portion 100 relative to the second portion 102). Therefore, the process of removing the piston 66 from the piston bore 40 can be accomplished without the use of tools.

Assembly of the piston 66 into the fluid end 14 can be based primarily on a reversal of the process of removing the piston 66 from the fluid end 14, as described above.

Various features and advantages of the invention are set forth in the following claims.

What is claimed is:

1. A piston rod assembly of a hydraulic fluid pump, the piston rod assembly comprising:
    an extension rod extending axially between a first axial end and a second axial end, the extension rod defined by a first portion, a second portion, and a third portion, wherein the first portion extends from the first axial end to the third portion and the second portion extends from the second axial end to the third portion; and
    a sleeve extending around the third portion, the sleeve configured to couple the first portion to the second portion,
    wherein the sleeve includes a first engagement feature engageable with the first portion, and the sleeve is rotatable relative to the extension rod between an engaged position and a disengaged position relative to the first portion.

2. The piston rod assembly of claim 1, wherein the sleeve further includes a second engagement feature, wherein, in the engaged position, the first engagement feature is coupled to the first portion and the second engagement feature is coupled to the second portion, and wherein, in the disengaged position, the first engagement feature is uncoupled from the first portion and the second engagement feature is uncoupled from the second portion.

3. The piston rod assembly of claim 2, wherein the first engagement feature includes one or more broken zero-pitch threads, and wherein the second engagement feature includes one or more broken zero-pitch threads.

4. The piston rod assembly of claim 2, wherein the sleeve is configured to axially translate along the extension rod between a first axial position and a second axial position, wherein, in the first axial position, the second engagement feature is axially aligned with a first engagement feature of the second portion, and wherein, in the second axial position, the second engagement feature is axially aligned with a second engagement feature of the second portion.

5. The piston rod assembly of claim 2, wherein the second portion of the extension rod includes a first engagement feature and a second engagement feature, wherein the second engagement feature of the sleeve is separately engageable with the first engagement feature of the second portion of the extension rod at a first axial position and the second engagement feature of the second portion of the extension rod at a second axial position.

6. The piston rod assembly of claim 1, further comprising a pin extending radially through the extension rod and configured to prevent rotation of the sleeve relative to the extension rod.

7. The piston rod assembly of claim 1, further comprising a piston coupled to the second portion of the extension rod.

8. A piston rod assembly for a hydraulic fluid pump, the piston rod assembly comprising:
    a first portion configured to be coupled to a drive end of the hydraulic fluid pump;
    a second portion configured to extend within a bore of a fluid end of the hydraulic fluid pump; and
    a sleeve removably coupled to the first portion via relative rotation between the sleeve and the first portion and removably coupled to the second portion via relative rotation between the sleeve and the second portion.

9. The piston rod assembly of claim 8, wherein the sleeve is rotatable between an engaged position and a disengaged position, wherein, in the engaged position the sleeve is coupled to the first portion and the second portion, and wherein, in the disengaged position the sleeve is uncoupled from the first portion and the second portion.

10. The piston rod assembly of claim 9, further comprising a pin coupled to at least one of the first portion, the second portion, or the third portion, the pin configured to prevent rotation of the sleeve from the engaged position to the disengaged position.

11. The piston rod assembly of claim 8, further comprising a piston coupled to the second portion of the extension rod.

12. The piston rod assembly of claim 8, further comprising a third portion positioned axially between the first portion and the second portion within the sleeve.

13. The piston rod assembly of claim 8, wherein the second portion includes a first engagement feature and a second engagement feature axially spaced apart from the first engagement feature, wherein the sleeve is removably coupled to the second portion at a first axial position via engagement with the first engagement feature, and wherein the sleeve is removably coupled to the second portion at a second axial position via engagement with the second engagement feature.

14. A method of disassembling a piston rod assembly of a hydraulic fluid pump, the method comprising:
    rotating a sleeve relative to an extension rod;
    axially translating the sleeve relative to the extension rod;
    removing a central portion of the extension rod from between a first end portion and a second end portion of the extension rod; and
    axially translating the second end portion of the extension rod from a bore of the hydraulic fluid pump,
    wherein rotating the sleeve relative to an extension rod includes rotating an engagement feature of the sleeve out of engagement with an engagement feature of the extension rod.

15. The method of claim 14, further comprising removing a pin from the extension rod prior to rotating the sleeve relative to the extension rod.

16. The method of claim 14, wherein the sleeve is rotated relative to the extension rod prior to axially translating the sleeve relative to the extension rod, wherein the method further comprises rotating the sleeve relative to the extension rod after axially translating the sleeve relative to the extension rod to axially couple the sleeve to the extension rod.

17. The method of claim 14, wherein axially translating the sleeve relative to the extension rod includes separating the sleeve from the first end portion of the extension rod.

18. The method of claim 14, wherein axially translating the second end portion of the extension rod from the bore of the hydraulic fluid pump includes rejoining the first end portion to the second end portion via the sleeve and actuating a drive end of the hydraulic fluid pump to retract the second end portion from the bore, the drive end coupled to the first end portion of the extension rod.

19. The method of claim 18, wherein rejoining the first end portion to the second end portion includes moving the first end portion relative to the second end portion, such that the first end portion extends into a space previously occupied by the central portion of the extension rod.

* * * * *